United States Patent [19]
Wadas

[11] Patent Number: 5,970,810
[45] Date of Patent: Oct. 26, 1999

[54] ADAPTIVE SPLITTER ACTUATOR ENGAGEMENT FORCE CONTROL

[75] Inventor: David L. Wadas, Kalamazoo, Mich.

[73] Assignee: Eaton Corporation, Cleveland, Ohio

[21] Appl. No.: 09/053,181

[22] Filed: Apr. 1, 1998

[51] Int. Cl.[6] .................................................. F16H 59/00
[52] U.S. Cl. ........................................ 74/335; 74/336 R
[58] Field of Search ...................... 74/335, 336; 477/78

[56] References Cited

U.S. PATENT DOCUMENTS

| | | | |
|---|---|---|---|
| 4,754,665 | 7/1988 | Vandervoort | 74/745 |
| 4,920,815 | 5/1990 | Reynolds | 74/335 |
| 4,974,468 | 12/1990 | Reynolds et al. | 74/477 |
| 5,000,060 | 3/1991 | Reynolds et al. | 74/745 |
| 5,186,066 | 2/1993 | Pankratz et al. | 74/335 |
| 5,193,410 | 3/1993 | Stine et al. | 74/336 |
| 5,199,311 | 4/1993 | Muyskens et al. | 74/335 |
| 5,199,312 | 4/1993 | Huggins et al. | 74/335 |
| 5,199,314 | 4/1993 | Hutchinson | 74/335 |
| 5,216,931 | 6/1993 | Hirsch et al. | 74/335 |
| 5,218,878 | 6/1993 | Monette et al. | 74/335 |
| 5,222,404 | 6/1993 | Stine | 74/335 |
| 5,224,392 | 7/1993 | Hutchinson | 74/335 |
| 5,231,895 | 8/1993 | Stine | 74/335 X |
| 5,329,826 | 7/1994 | Graves, Jr. et al. | 74/335 |
| 5,370,013 | 12/1994 | Reynolds et al. | 74/330 |
| 5,390,561 | 2/1995 | Stine | 74/331 |
| 5,582,558 | 12/1996 | Palmeri et al. | 477/109 |
| 5,651,292 | 7/1997 | Genise | 74/745 |
| 5,661,998 | 9/1997 | Genise | 74/335 |

*Primary Examiner*—Khoi Q. Ta
*Attorney, Agent, or Firm*—Howard D. Gordon

[57] ABSTRACT

A control system for controlling splitter jaw clutch (88) engagement and disengagement forces during a splitter section (16B) shift. The splitter section is shifted by a variable force splitter actuator (142) and is preferably capable of asserting at least a low, medium and high force to the splitter jaw clutch members.

8 Claims, 6 Drawing Sheets

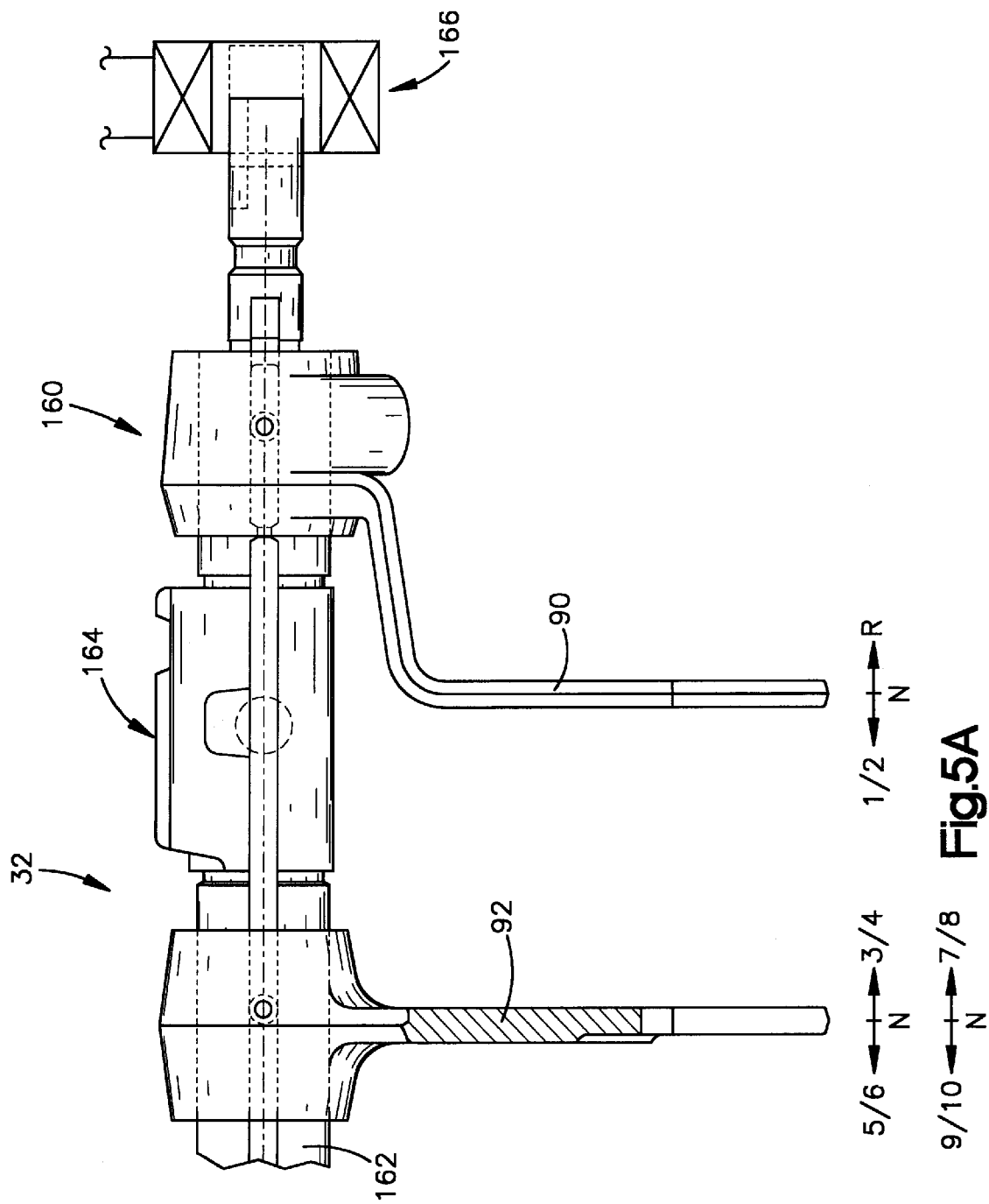

ADAPTIVE SPLITTER ACTUATOR ENGAGEMENT FORCE CONTROL

RELATED APPLICATIONS

This application is related to the following co-pending applications, all assigned to EATON CORPORATION, the assignee of this application:

Ser. No. 09/053,089 mailed Apr. 1, 1998 and titled RANGE SHIFT CONTROL

Ser. No. 09/053,093 mailed Apr. 1, 1998 and titled ADAPTIVE UPSHIFT JAW CLUTCH ENGAGEMENT CONTROL Ser. No. 09/053,092 mailed Apr. 1, 1998 and titled ENGINE FUEL CONTROL FOR COMPLETING SHIFTS IN CONTROLLER-ASSISTED, MANUALLY SHIFTED TRANSMISSIONS Ser. No. 09/053,095 mailed Apr. 1, 1998 and titled DYNAMIC RANGE SHIFT ACTUATION, now U.S. Pat. No. 5,911,787

Ser. No. 09/053,091 mailed Apr. 1, 1998 and titled JAW CLUTCH ENGAGEMENT CONTROL FOR ASSISTED, MANUALLY SHIFTED, SPLITTER-TYPE TRANSMISSION SYSTEM Ser. No. 09/053,090 mailed Apr. 1, 1998 and titled ADAPTIVE NEUTRAL SENSING Ser. No. 08/902,603 filed Aug. 7, 1997 and titled PARIALLY AUTOMATED, LEVER-SHIFTED MECHANICAL TRANSMISSION SYSTEM Ser. No. 08/990,678 mailed Dec. 11, 1997 and titled ASSISTED LEVER-SHIFTED TRANSMISSION.

BACKGROUND OF THE INVENTION

1. Field of the Invention

The present invention relates to a control for controlling the force applied to splitter jaw clutches during engagement and disengagement under various vehicle operating conditions.

The adaptive control may be utilized with a fully or partially automated vehicular transmission system or with the range or, preferably, the splitter section of a controller-assisted, manually shifted transmission.

2. Description of the Prior Art

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems by be seen by reference to U.S. Pat. Nos. 4,455,883; 4,550,627; 4,899,607; 4,920,815; 4,974,468; 5,000,060; 5,272,931; 5,281,902; 5,222,404 and 5,350,561, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292 and 5,679,096; 5,682,790; the disclosures of which are incorporated herein by reference.

Systems wherein variable force is used to engage auxiliary sections, usually to protect range or splitter section synchronizers, are known in the prior art, as may be seen by reference to U.S. Pat. Nos. 5,186,066; 5,193,410; 5,199,314 and 5,224,392, the disclosures of which are incorporated herein by reference.

SUMMARY OF THE INVENTION

A preferred embodiment of the present invention involves a computer-assisted mechanical compound transmission system wherein the main section is shifted by a manually controlled shift lever and the engine is fueled and/or the auxiliary sections are shifted by actuators at least partially controlled by an ECU to enhance shifting. The ECU uses sensed and/or calculated inputs indicative of system operating parameters, such as operation of a splitter switch and/or a range switch, position and/or rate of change of position of the shift lever, engaged gear ratio, engine speed, rate of change of engine speed, output shaft speed, rate of change of output shaft speed, clutch condition and/or throttle pedal position, to assist shifting by controlling engine fueling and/or operation of the range and/or splitter shift actuators.

In accordance with the present invention, the drawbacks of the prior art are minimized or overcome by the provision of a splitter jaw clutch control which adaptively adjusts the force applied to the splitter clutch during engagement and disengagement, in view of vehicle operating conditions, to provide an optimized compromise between fast and reliable splitter shifts, reduced wear and shock-free shifting.

In the preferred embodiment, a three-position splitter clutch (see U.S. Pat. No. 5,651,292) of a controller-assisted, manually shifted transmission is controlled during splitter shifts by varying the synchronous window at which splitter clutch engagements are commanded as a function of the rates of change with respect to time of both engine speed ($d/dt(ES)$) and vehicle speed ($d/dt(OS)$). In the preferred embodiment, if the main section and splitter section both are not engaged, the splitter will be caused to engage with full force without regard for synchronous conditions.

If vehicle deceleration is less than a vehicle deceleration reference value (i.e., $d/dt(OS)>REF_1$?), then the offset or synchronous window remains at a default value selected to provide good quality shifts. However, if vehicle deceleration is great (i.e., $d/dt(OS)<REF_1$?), the synchronous window will be opened (i.e., offset increased) as a function of vehicle deceleration if engine deceleration is at least a reference value (i.e., $d/dt(ES)<REF_2$?), or as a function of both vehicle deceleration and of engine deceleration if engine deceleration is relatively low (i.e., $d/dt(ES)>REF_2$?). This control technique allows the driver to use the same shifting technique (even "float shifting") on flats and on steep grades.

In the preferred embodiment, the splitter actuator is a double-sided piston having chambers which are constantly or selectively exhausted and/or coupled to a source of pressurized fluid. Pulse width modulation control is utilized to vary the effective pressure of the pressurized fluid applied to the piston to controllably vary the force applied to the splitter clutch during engagement and disengagement thereof as a function of sensed vehicle operating conditions.

By way of example, to minimize wear, the splitter clutch usually is disengaged with a relatively low force, while engagement at sensed synchronous conditions usually is at a relatively high force, to provide rapid and full jaw clutch engagement.

Accordingly, it is an object of the present invention to provide ECU assistance for enhanced splitter shifting of a mechanical compound transmission.

This and other objects and advantages of the present invention will become apparent from a reading of the following description of the preferred embodiment taken in connection with the attached drawings.

BRIEF DESCRIPTION OF THE DRAWINGS

FIGS. 5A and 5B are schematic illustrations of a shift shaft position sensor mechanism for use in the system of FIG. 1.

DESCRIPTION OF THE PREFERRED EMBODIMENT

Figure 1:
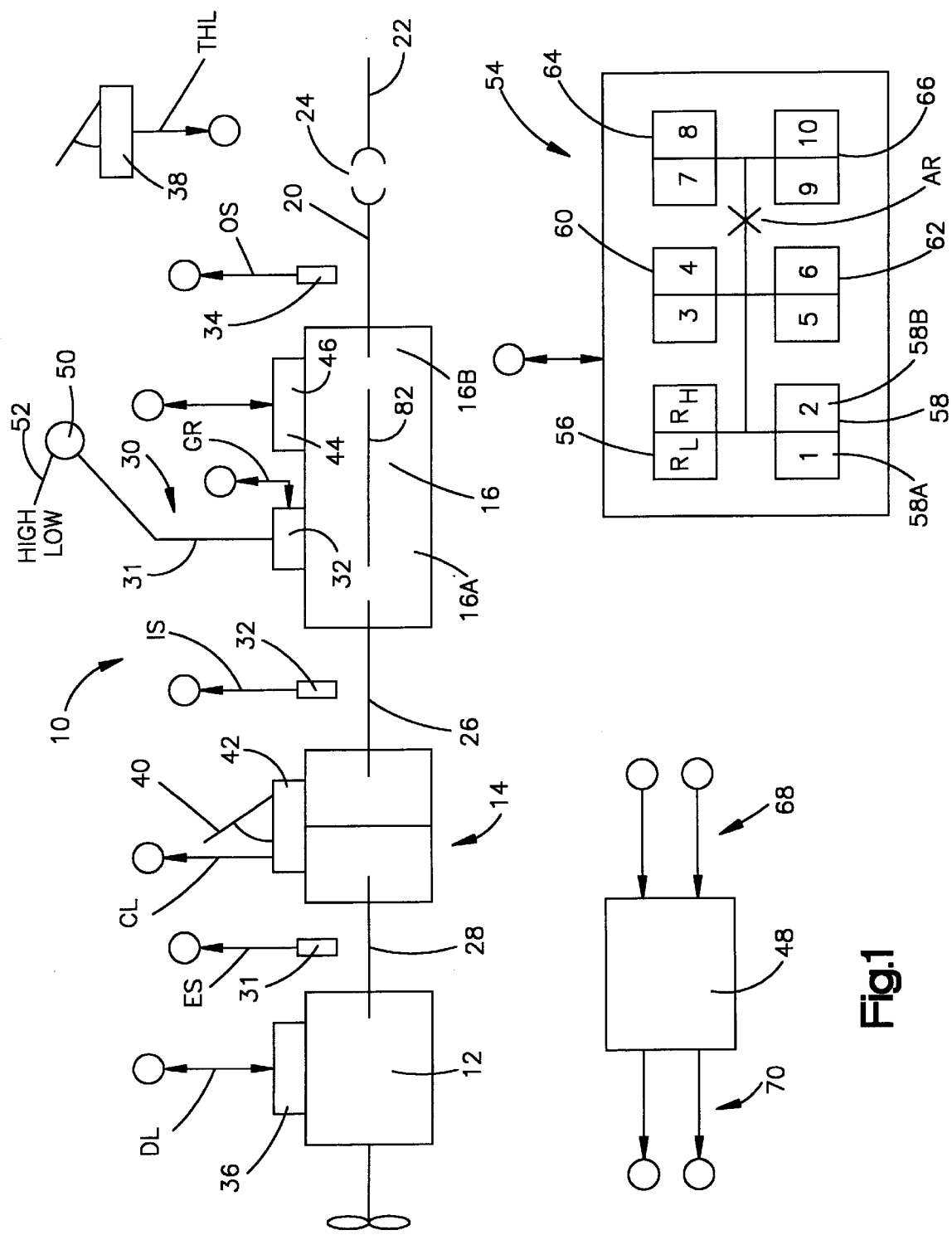
FIG. 1 is a schematic illustration of an ECU-assisted compound mechanical transmission system advantageously utilizing the adaptive jaw clutch engagement control of the present invention.

A computer-assisted (i.e., microprocessor-based, controller-assisted) vehicular compound mechanical transmission system 10, particularly well suited to utilize the adaptive splitter jaw clutch engagement control of the present invention, may be seen by reference to FIGS. 1–5B.

System 10 is of the type commonly utilized in heavy-duty vehicles, such as the tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

Figure 2:
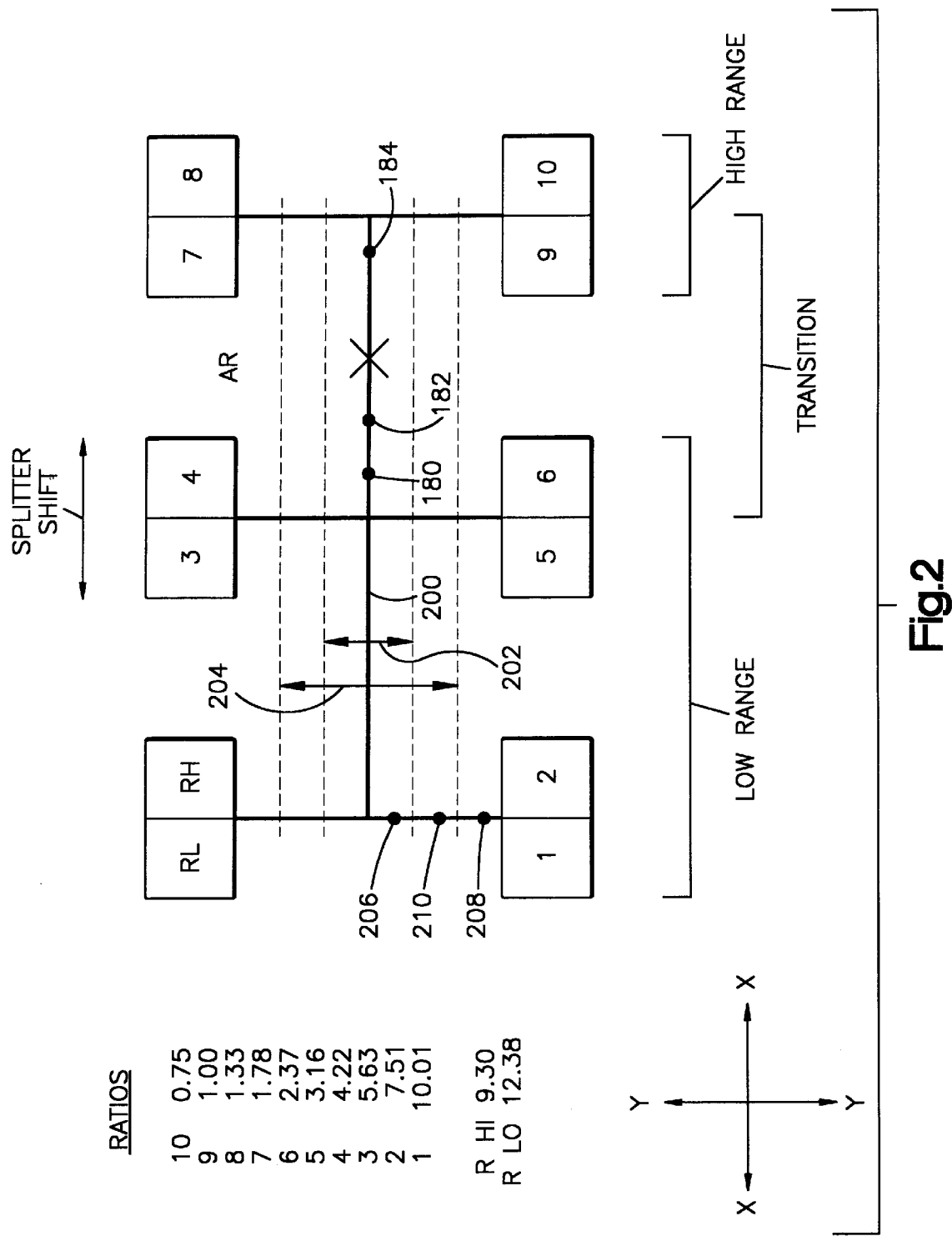
FIG. 2 is a chart illustrating the shift pattern and representative numerical ratios for the transmission of FIG. 1.

FIG. 2 illustrates a shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the automatic range shifting feature, as the shift lever moves in the transition area between the middle leg (3/4–5/6) and the righthand leg (7/8–9/10) of the shift pattern, it will cross a point, AR, which will actuate a mechanical or electrical range switch, or will be sensed by a position sensor, to cause automatic implementation of a range shift.

Shifting of transmission 16, comprising main section 16A coupled in series to auxiliary section 16B, is semi-automatically implemented/assisted by the vehicular transmission system 10, illustrated in FIGS. 1–5B. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change gear ratio of main section 16A.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 fully (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal and sensor 32 is not required. Input shaft speed sensor 32 may be eliminated and engine speed (ES), as sensed by a sensor or over a data link (DL), substituted therefor.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque ($T_{EG}$) and base engine friction torque ($T_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains splitter selector switch 52 by which a driver's intent to initiate a splitter shift may be sensed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in U.S. Pat. No. 5,651,292 (the disclosure of which is incorporated herein by reference) and co-pending patent application U.S. Ser. No. 08/597,304 (assigned to the assignee of this application), the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

Figure 3:
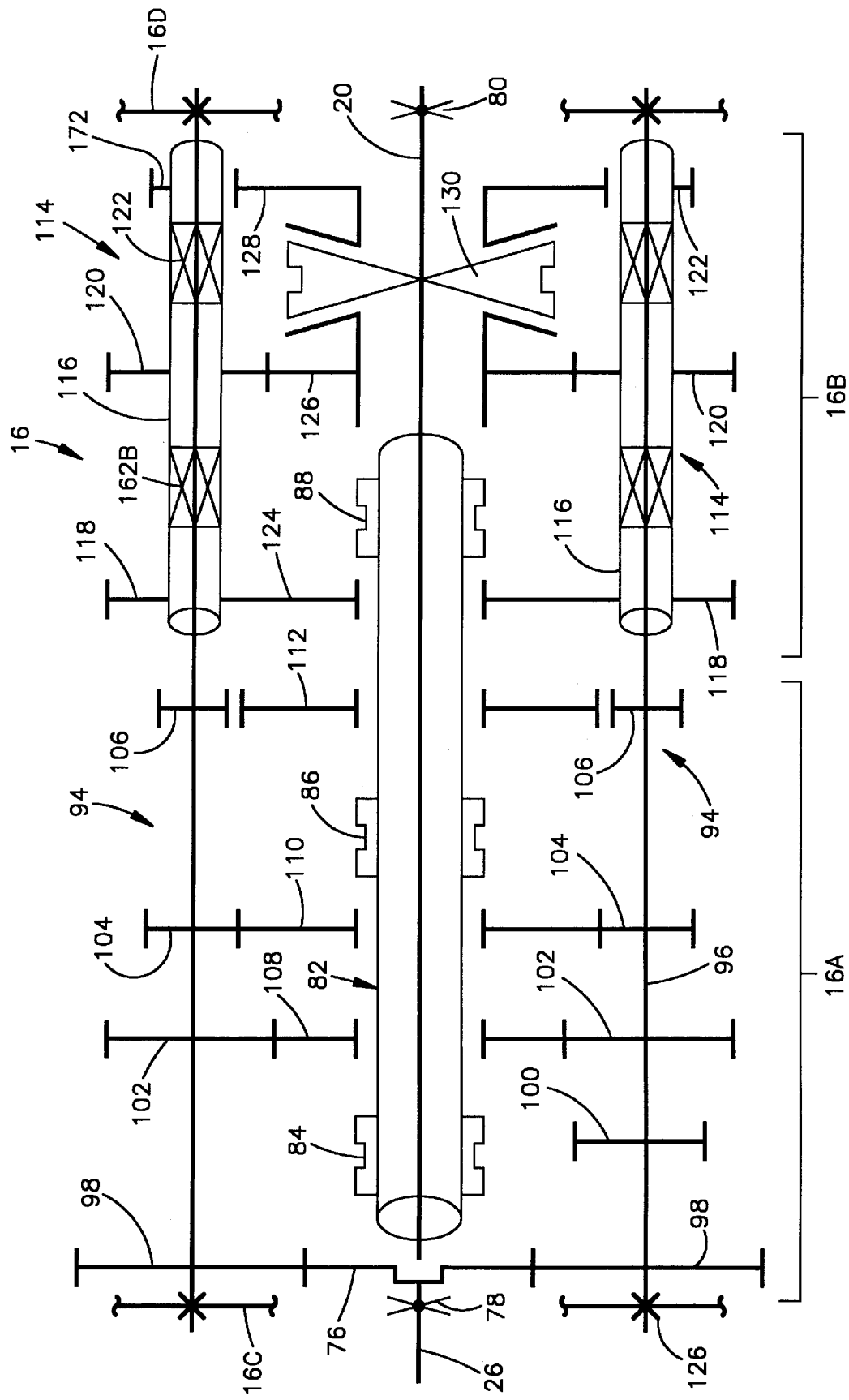
FIG. 3 is a schematic illustration of the structure of the compound mechanical transmission of FIG. 1.

The structure of the 10-forward-speed combined range-and-splitter-type transmission 16 is schematically illustrated in FIG. 3. Transmissions of this general type are disclosed in aforementioned U.S. Pat. Nos. 5,000,060; 5,370,013 and 5,390,561.

Transmission 16 includes a main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith and defines a rearwardly opening pocket wherein a reduced diameter extension of output shaft 20 is piloted. A non-friction bushing or the like may be provided in the pocket or blind bore. The rearward end of input shaft 26 is supported by bearing 78 in front end wall 16C, while the rearward end of output shaft 20 is supported by bearing assembly 80 in rear end wall 16D.

The mainshaft 82, which carries mainshaft clutches 84 and 86, and the mainshaft splitter clutch 88 is in the form of a generally tubular body having an externally splined outer surface and an axially extending through bore for passage of output shaft 20. Shift forks 90 and 92 are provided for shifting clutches 84 and 86, respectively (see FIG. 5A). Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gears 98, 100, 102, 104 and 106 fixed thereto. Gear pairs 98, 100, 102, 104 and 106 are constantly meshed with input gear 76, mainshaft gears 108 and 110 and an idler gear (not shown), which is meshed with reverse mainshaft gear 112, respectively.

Main section countershaft 96 extends rearwardly into the auxiliary section, where its rearward end is supported directly or indirectly in rear housing end wall 16D.

The auxiliary section 16B of transmission 16 includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

Auxiliary countershafts 116 are generally tubular in shape, defining a through bore for receipt of the rearward extensions of the main section countershafts 96. Bearings or bushings are provided to rotatably support auxiliary countershaft 116 on main section countershaft 96.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to controller 48, which senses operation of the driver selection switch (such as a button or the like on the shift knob), as is known in the prior art and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

In the prior art, especially for manual transmissions, the splitter clutches were operated by two-position actuators and, thus, were provided with a relatively small backlash (i.e., about 0.008–0.012 inches backlash for a clutch having about a 3.6-inch pitch diameter) to prevent unduly harsh splitter shifting. Typically, with the above backlash and the usual engagement forces, at greater than about 60 RPM input shaft synchronous error, the clutch teeth would ratchet or "buzz" and clutch engagement would not occur.

As is known (see U.S. Pat. No. 5,052,535, the disclosure of which is incorporated herein by reference), allowable relative rotational speed at which the positive clutches will properly engaged (i.e., sufficient clutch tooth penetration will occur) is a directly proportional function of the total effective backlash in the clutch system. The maximum allowable asynchronous conditions at which clutch engagement is allowed is selected in view of the most harsh clutch engagement which is acceptable.

In change-gear transmissions utilizing the non-synchronized positive clutch structures, especially for heavy-duty vehicles, for a given total backlash (i.e., a given maximum allowably harsh clutch engagement), the range of asynchronous conditions at which the clutch members will engage is often narrower than desirable under certain conditions, making shifting more difficult.

According to the present invention, and as more fully described in aforementioned U.S. Pat. No. 5,651,292, the interengaging clutch teeth provided on splitter clutch 88 and on splitter gear 124 and splitter/range gear 126 are of a relatively large backlash (i.e., about 0.020–0.060 inches for 3.6-inch pitch diameter clutch), which will assure that, at full engagement force, almost any attempted splitter shift under full force will be completed.

Figure 4:
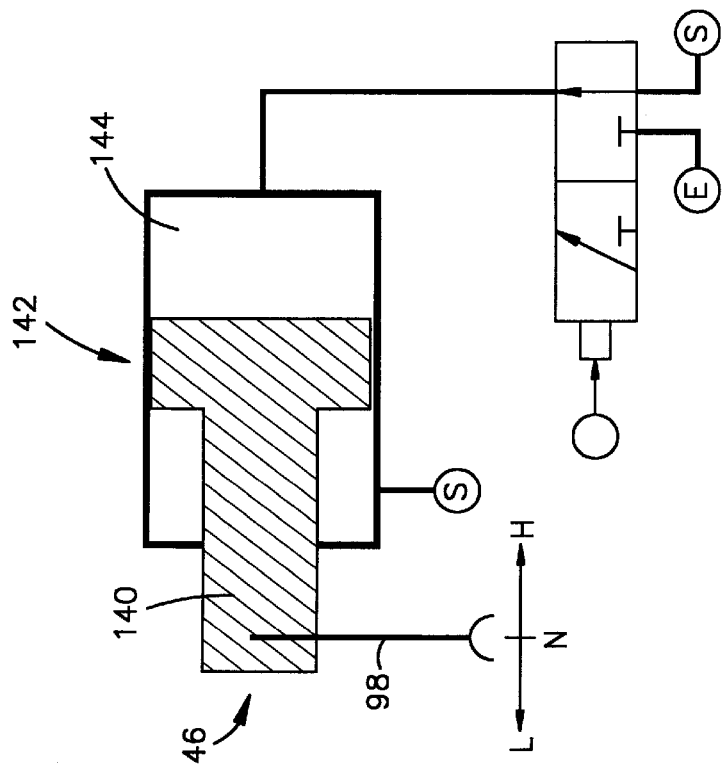
FIG. 4 is a schematic illustration of a three-position splitter actuator for use with the transmission system of FIG. 1.

The splitter clutch 88 is moved by a shift fork 98 attached to the piston rod 140 of the piston actuator assembly 142 (see FIG. 4). Actuator assembly 142 may be a conventional three-position actuator (see U.S. Pat. No. 5,054,591, the disclosure of which is incorporated herein by reference) or an actuator of the type illustrated in U.S. Pat. Nos. 5,682,790 or 5,661,998 (the disclosures of which are incorporated herein by reference), wherein pulse width modulation of a selectively pressurized and exhausted chamber 144 may be used to achieve the three splitter positions (L, N, H) of the shift fork.

Pulse width modulation of the pressurized fluid supplied to chamber 144 also may be utilized to control the force applied to the splitter clutch 88. Pulse width modulation control of pressurized fluid and/or exhaust valving is a well-known control technique. Other types of actuators may be utilized to apply a controlled force to splitter clutch 88.

In system 10, splitter switch 52 will indicate the driver's intent to initiate a splitter shift under the control of ECU 48. The controller 48 is provided with logic rules under which, if the main section is engaged, a shift from splitter neutral into a selected target splitter ratio is initiated such that, under normal conditions, including proper operator fuel control, the synchronous error (which is equal to input shaft rotational speed minus the product of output shaft rotational speed and transmission target gear ratio) is expected to be equal to or less than a value selected to give smooth, high-quality shifts $((IS-(OS*GR))=ERROR \leq REF)$. The timing is done in regard to sensed/expected shaft speeds, shaft acceleration/deceleration and actuator reaction times. As is known, automated hydraulic, pneumatic or mechanical jaw clutch engagement systems have to be tuned to deliver a clutch engagement that is a compromise between engaging the clutch without shift shock and delivering a fast shift. If the clutch engages only exactly at synchronous, the driver may get impatient and reapply fuel before the clutch engages. This approach also may result in the shift being missed on a grade or any situation that causes the vehicle to decelerate quickly or the engine to decelerate slowly. If the clutch engages far out of synchronous, the driver complains about the "shift shock" or jerk that occurs as the clutch engages.

According to the present invention, in certain situations, the logic rules will recognize operating conditions wherein the preferred or default synchronous window (i.e., IS= (OS*GR)±60 RPM) must be expanded to accomplish a splitter shift, even at the expense of shift quality. These situations, usually associated with upshifts, include if shifting is attempted at low engine speeds wherein expected engine speed at shift completion will be undesirably low, if deceleration of the output shaft is relatively high (dOS/dt<$REF_1$), if the deceleration of the engine is relatively low (dES/dt>$REF_2$) and/or if the absolute value of the synchronous error is not approaching the normal value at an acceptable rate.

In the preferred embodiment of the present invention, completion of splitter shifts when the main section is engaged (i.e., a shift from the centered or neutral position into the target splitter ratio) is commanded when input shaft rotational speed (IS) is or is expected to be within the synchronous window (i.e., $((OS*GR_T)+offset_1)>IS>((OS*GR_T)-offset_2)$). Assuming for this discussion that the offsets are equal, this may be written IS=$((OS*GR_T)\pm offset)$. At ideal operating conditions, the offset is at a default minimal value intended to provide an acceptable shift quality and shift quickness. In the example above, the default offset was ±60 RPM, giving a default synchronous window width of 120 RPM.

By using a three-position splitter actuator and increased splitter clutch backlash, splitter clutch engagements are possible but not usually desirable (for shift quality and other reasons) over a very great band of non-synchronous conditions.

According to the jaw clutch control of the present invention, in the event of a splitter upshift, when in "splitter neutral," the ECU will compare vehicle deceleration (as indicated by dOS/dt) to a reference value ($REF_1$) selected to represent the greatest vehicle acceleration under which the default synchronous window will allow rapid, "shock-free" and reliable shifts. If vehicle deceleration exceeds this reference, the synchronous window should be expanded to provide more reliable (if somewhat harsher) splitter shifts. If not, the default synchronous window will provide sufficiently rapid and reliable shifting.

If vehicle deceleration does exceed the reference value, engine deceleration is compared to an engine deceleration reference value ($REF_2$) to determine if the engine is decelerating at least at an expected value (typically about −450 RPM to −600 RPM for a heavy-duty diesel truck engine). If the engine is decelerating in an acceptable manner, the synchronous window offset is increased only an amount determined as a function of vehicle deceleration. If, however, vehicle deceleration is great and engine deceleration is low (dES/dt>$REF_2$), then the synchronous window offset is increased an amount determined as a sum of (i) the amount determined as a function of vehicle deceleration and (ii) an amount determined as a function of engine deceleration.

For splitter-only upshifts, such as 3–4 and 5–6 shifts, the shifts are completed by engaging the appropriate splitter clutch, as indicated above. For combined main section and splitter section upshifts (also called "compound shifts"), such as 2–3, 4–5 or 8–9 shifts, the preferred shifting technique is that the driver preselects the appropriate splitter position (using the selector 52), breaks torque (using the master clutch 14 and/or throttle control), and then uses the shift lever to shift into neutral, while the throttle and/or engine brake is used to cause synchronous input shaft speed for engaging the target gear ratio ($GR_T$). To give the operator the maximum control over his vehicle, it is preferred that the splitter "beat" (i.e., engage before) the main section. If the main section is sensed as being in neutral, the splitter will preferably engage without regard for the presence or absence of synchronous conditions, and the operator, possibly with the assistance of ECU fuel control, will complete the shift. However, if the operator uses the shift lever to beat the splitter section, the splitter clutch is held in the neutral or disengaged position until synchronous conditions are sensed or it is determined that the main clutch 14 is probably disengaged, and then the shift is completed by engaging the appropriate splitter clutch.

While the jaw clutch engagement control of the present invention has been described in connection with controlling splitter shifting in a computer-assisted, manually shifted transmission, it also is potentially applicable to shifting of transmission main sections and/or range sections.

The position of the shift lever 31 or of the shifting mechanism 32 controlled thereby may be sensed by a position sensor device. Various positioning sensing assemblies are known in the prior art, with a preferred type illustrated in allowed U.S. Ser. No. 08/695,052, assigned to the assignee of this application, the disclosure of which is incorporated herein by reference.

Figure 5B:
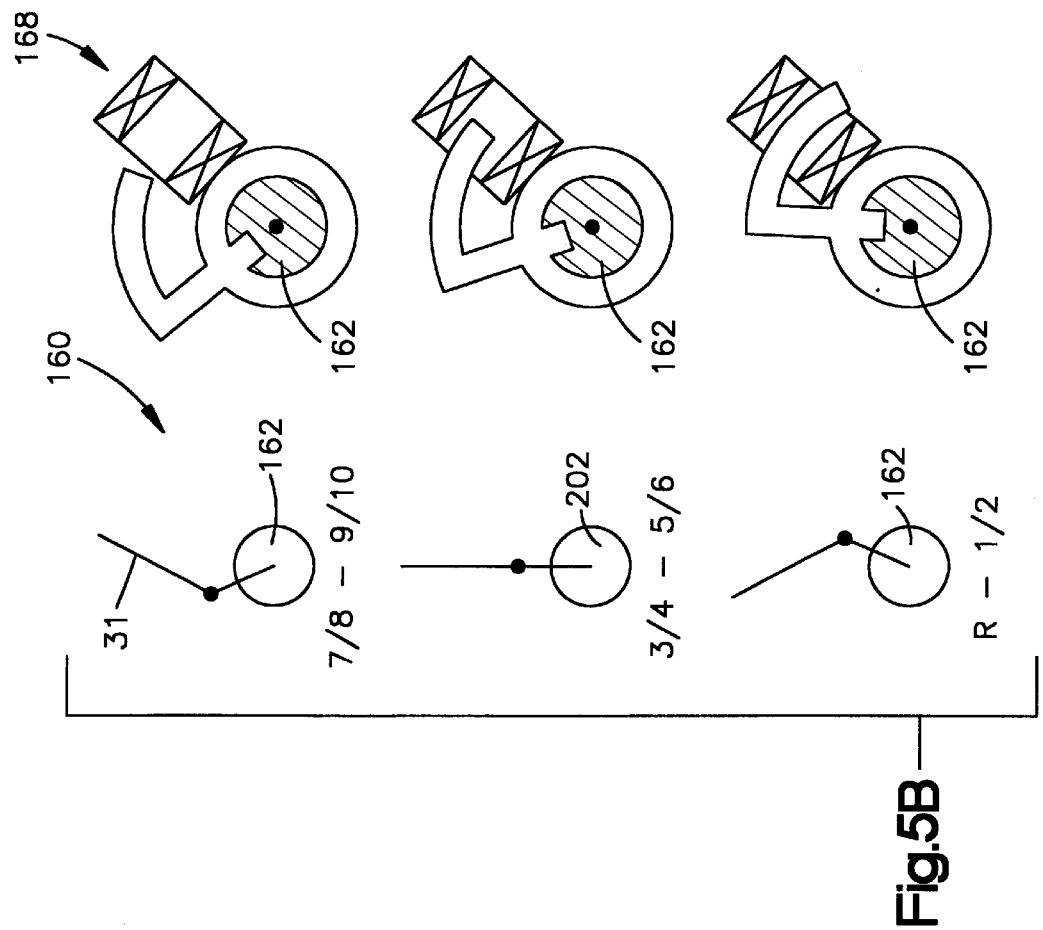

Referring to FIGS. 5A and 5B, shifting mechanism 32 is illustrated as a single shift shaft device 160 having a shaft 162 which is rotatable in response to X—X movements of shift lever 31 and axially movable in response to Y—Y movements of shift lever 31. Mechanisms of this type are described in detail in aforementioned U.S. Pat. No. 4,920,815.

Shift shaft 162 carries the main section shift forks 90 and 92 for selective axial movement therewith and a shift block member 164 for receiving a shift finger or the like. A pair of coils 166 and 168 provide a pair of signals (collectively GR) indicative of the axial and rotational position of shaft 162 and, thus, of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated. Further, as physical switches are no longer required, the shift pattern position at which a range shift will be commanded can be varied, such as to points 180, 182 or 184, to enhance system performance under various operating conditions.

If in first (1st) through fourth (4th), a shift into high range is unlikely and the auto range shift initiation point may be moved to position 184 (away from the expected shift lever path) to prevent inadvertent actuation of a range shift. If in sixth (6th) with a high engine speed, a shift into high range is likely and moving the auto range initiation point to position 180 will allow for a quicker initiation of a range shift.

According to the preferred embodiment of the present invention, the operator is allowed to control engine fueling unless the current vehicle operating conditions indicate that his/her operation of the throttle pedal will not allow the splitter jaw clutches associated with the current target ratio to engage. If operating conditions, including operator setting of the throttle pedal, indicate that the operator will complete a splitter shift into target ratio, the engine will be fueled in accordance with operator throttle setting. If not, automatic engine fueling will occur. If the splitter section does engage prior to the main section, as is preferred, the operator will remain in complete control of engine fueling to complete the shift by engaging the main section.

The state of engagement (i.e., engaged or neutral) of the main transmission section 16A is an important control parameter for system 10. By way of example, if main section neutral is sensed, the splitter may be commanded to a full force engagement, regardless of the existence or absence of synchronous conditions. Also, if the main section is engaged while the splitter is in neutral, the system will not cause splitter engagement until substantial synchronous is sensed and may then initiate automatic fuel control if required. Of course, it is important to prevent or minimize false determinations of main section neutral and/or engaged conditions.

Referring to FIG. 2, a first narrow band 202 and a second wider band 204 of vertical displacements from the bight portion 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change.

Vehicle operating conditions other than or in addition to currently engaged or neutral condition of the main section 16A may be used to vary the width of the neutral sensing bands.

In a preferred embodiment, the shift logic is timed so that the splitter will normally engage prior to the main section during a compound shift. If the main section is disengaged, the splitter will be caused to engage without regard for synchronous conditions. The ECU will take over fuel control from the operation only to complete a splitter shift when the main section is engaged (all splitter-only shifts and only those compound shifts wherein the driver happens to beat the splitter) and then only if the operator is doing a very poor job of fuel control. In this preferred embodiment, in a compound shift, if the splitter beats the operator, the operator is totally on his own as to fuel control for completing the shift by engaging the main section.

Figure 6A:
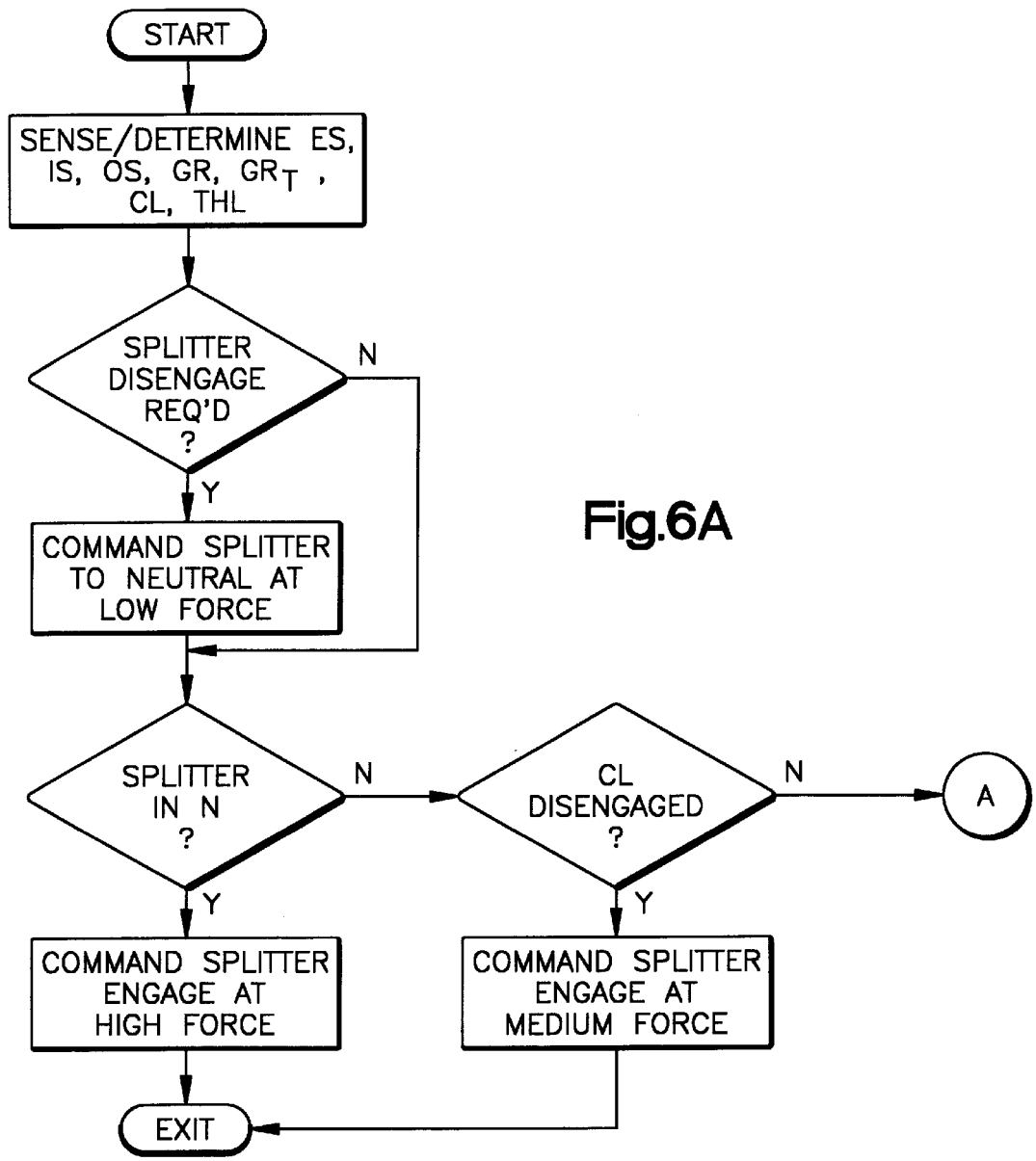
FIGS. 6A and 6B are schematic illustrations, in flow chart format, of the control of the present invention.
Figure 6B:
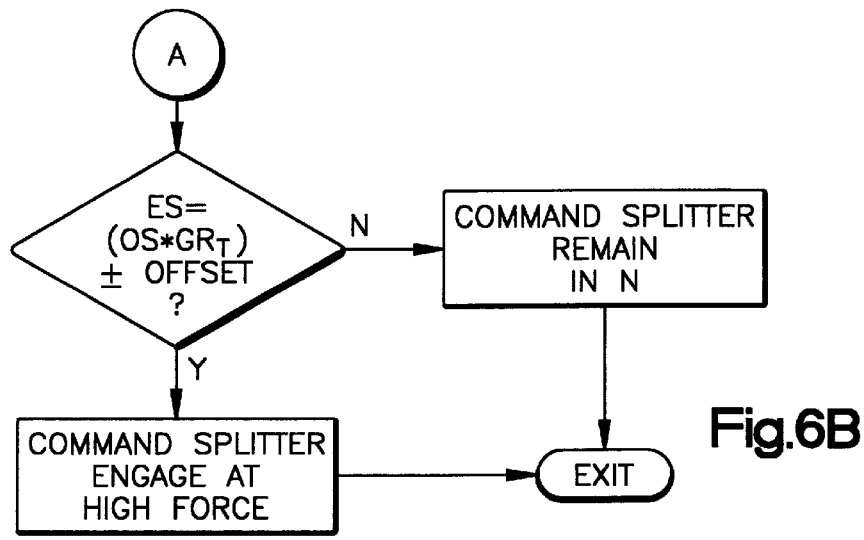

In the preferred embodiment, as illustrated in flow chart format in FIGS. 6A and 6b, upon a preselection of a splitter shift, the splitter actuator is precharged to shift into splitter neutral at a relatively low force until splitter (and/or main section) neutral is sensed.

After sensing neutral, when (1) synchronous conditions are sensed with the main section engaged or (2) main section neutral is sensed, the splitter clutch is commanded to engage in the appropriate splitter ratio at a relatively high force.

If the master clutch switch 42 indicates that the master clutch 14 is probably disengaged, or if synchronous cannot be positively obtained, the actuator is caused to engage the splitter clutch 88 at a medium force. Medium force is also used to engage the splitter clutch when the system cannot insure that it has proper information to determine synchronous and also to cause clutch "racking" or "ratcheting" to inform the driver when synchronous conditions for engaging the splitter cannot be achieved.

Accordingly, it may be seen that a new and improved splitter jaw clutch engagement control is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling a vehicular transmission system during an attempt to shift a splitter transmission section to engage a target gear ratio ($GR_T$), said transmission system comprising a fuel-controlled engine, an engine controller for controlling the supply of fuel to the engine in response to command signals, a splitter-type mechanical change-gear transmission including a main transmission section connected in series with said splitter transmission section and having an input shaft driven by said engine through a master friction clutch, an output shaft and defining a plurality of selectively engaged and disengaged gear ratios for providing various ratios of input shaft rotational speed to output shaft rotational speed (IS/OS), said splitter transmission section defining two splitter section gear ratios and being shifted by disengaging one of a first and second set of positive jaw clutch members and then engaging the other of said first and second sets of positive jaw clutch members, a variable force splitter shift actuator for controlling engagement and disengagement of said positive jaw clutch members in response to command signals, a control unit for receiving input signals indicative of vehicle operating conditions including at least two of (i) engine rotational speed (ES), (ii) input shaft rotational speed (IS), (iii) output shaft rotational speed (OS), (iv) master clutch engaged or disengaged condition (CL), and (v) main section engaged or disengaged condition (GR), and for processing same according to logic rules to issue command signals to at least said splitter shift actuator, said method comprising:
    (a) commanding said splitter shift actuator to disengage an engaged one of said first and second sets of positive jaw clutch members at a first force; then
    (b) determining disengagement of at least one of said main transmission section and said splitter transmission section; then
    (c) maintaining both said first and second sets of positive jaw clutch members disengaged upon determining (i) said main transmission section is engaged and (ii) synchronous conditions for engaging said target gear ratio do not exist; and
    (d) commanding said splitter shift actuator to engage the other of said first and second sets of positive jaw clutch members at a second force greater than said first force upon sensing one of (i) disengagement of said main transmission section and (ii) substantially synchronous conditions for engaging said target gear ratio.

2. The method of claim 1 further comprising, after step (c), commanding engagement of the other of said first and second sets of positive jaw clutches at a third force greater than said first force but less than said second force upon sensing one of (i) disengagement of said master clutch and (ii) a deficiency in information to confirm substantially synchronous conditions for engaging said target gear ratio.

3. The method of claim 1 wherein said control unit is microprocessor based and communicates over an electronic data link (DL) conforming to an industry-recognized protocol (SAE J-1922/1939).

4. The method of claim 3 wherein said transmission system is a control unit assisted manually shifted transmission system including an operator set throttle demand device for providing a signal indicative of operator engine fueling demand (THL), said engine controller has at least one mode of operation wherein engine fueling is provided in accordance with said operator-set fuel throttle demand device and at least one mode of operation wherein engine fueling is provided to achieve a requested engine speed (ES) value, said control unit receives said input signal indicative of throttle demand device setting and said control unit issues command signals to said engine controller.

5. A control system for controlling a vehicular transmission system during an attempt to shift a splitter transmission section to engage a target gear ratio ($GR_T$), said transmission system comprising a fuel-controlled engine, an engine controller for controlling the supply of fuel to the engine in response to command signals, a splitter-type mechanical change-gear transmission including a main transmission section connected in series with said splitter transmission section and having an input shaft driven by said engine through a master friction clutch, an output shaft and defining a plurality of selectively engaged and disengaged gear ratios for providing various ratios of input shaft rotational speed to output shaft rotational speed (IS/OS), said splitter transmission section defining two splitter section gear ratios and being shifted by disengaging one of a first and second set of positive jaw clutch members and then engaging the other of said first and second sets of positive jaw clutch members, a variable force splitter shift actuator for controlling engagement and disengagement of said positive jaw clutch members in response to command signals, a control unit for receiving input signals indicative of vehicle operating conditions including at least two of (i) engine rotational speed (ES), (ii) input shaft rotational speed (IS), (iii) output shaft rotational speed (OS), (iv) master clutch engaged or disengaged condition (CL), and (v) main section engaged or disengaged condition (GR), and for processing same according to logic rules to issue command signals to at least said shift actuator, said control system comprising:
    means for commanding said actuator to disengage an engaged one of said first and second sets of positive jaw clutch members at a first force;
    means for determining disengagement of at least one of said main transmission section and said splitter transmission section;
    means for maintaining both said first and second sets of positive jaw clutch members disengaged upon determining (i) said main transmission section is engaged and (ii) synchronous conditions for engaging said target gear ratio do not exist; and
    means for commanding said actuator to engage of the other of said first and second sets of positive jaw clutches at a second force greater than said first force upon sensing one of (i) disengagement of said main transmission section and (ii) substantially synchronous conditions for engaging said target gear ratio.

6. The control system of claim 5 wherein said control unit is microprocessor based and communicates over an electronic data link (DL) conforming to an industry-recognized protocol (SAE J-1922/1939).

7. The control system of claim 5 wherein said transmission system is a control unit assisted manually shifted transmission system including an operator set throttle demand device for providing a signal indicative of operator engine fueling demand (THL), said engine controller has at least one mode of operation wherein engine fueling is provided in accordance with said operator-set fuel throttle demand device and at least one mode of operation wherein engine fueling is provided to achieve a requested engine speed (ES) value, said control unit receives said input signal indicative of throttle demand device setting and said control unit issues command signals to said engine controller.

8. The control system of claim 6 wherein said splitter actuator comprises a pressurized fluid actuated piston connected to a source of pressurized fluid by a pulse width modulation-controlled valve.

* * * * *